Dec. 19, 1939.    A. A. PAGE    2,183,657

AEROBIC FILTER

Filed Nov. 26, 1934

INVENTOR
ARTHUR A. PAGE
BY Paul, Paul + Moore
ATTORNEYS

Patented Dec. 19, 1939

2,183,657

UNITED STATES PATENT OFFICE 2,183,657

AEROBIC FILTER

Arthur A. Page, Red Wing, Minn.

Application November 26, 1934, Serial No. 754,811

3 Claims. (Cl. 210—7)

This invention relates to new and useful improvements in filters such as used for sewage disposal, and the like, and more particularly to the filtering medium of aerobic filters.

At present, it is common practice to use crushed rock material in the construction of filter beds. This material is supported in a large tank or walled structure having a perforated bottom, or other means at the bottom thereof whereby the sewage water may drain therefrom. The sewage or impure water to be treated is introduced into the filter at the top of the filter bed and trickles downwardly through the crushed rock material, whereby the organic matter in the sewage water becomes oxidized and converted into protoplasm. This protoplasm is subsequently removed from the purified sewage water in a suitable settling tank.

It has been found that by increasing the number of interstices or voids in the filter bed, and also the effective surface area of the filtering medium in the filter bed, that reproduction and propagation of aerobic biological organisms is encouraged, whereby the operation of converting the organic matter in the sewage water to protoplasm, may be greatly expedited, and efficient and thorough purification of the water obtained. From actual experience, I have found that by substituting in place of the usual rock material, a plurality of small fabricated clay units, suitably shaped, and each having a plurality of holes extending therethrough, that the voids in the filter bed may be greatly increased and the effective surface area of the filter bed increased.

An object of the present invention, therefore, is to provide an aerobic filter bed constructed or built up of a suitable filtering medium comprising a plurality of small fabricated filter units suitably treated, whereby they are substantially non-absorbent, and which, when arranged in the filter bed, will greatly increase the number of voids therein and also the effective surface area of the bed.

A further object is to provide a filtering medium for sewage filters and the like, comprising a plurality of small hard clay units, preferably cylindrical in cross section, and each having a plurality of holes extending therethrough, preferably in an axial direction, whereby when said units are arranged in the filter bed, the sewage water will trickle downwardly through the holes in said units, and between the units, in direct contact with the surfaces thereof, whereby the filter bed is maintained in an aerobic condition to thereby facilitate bacteriological propagation.

A further object is to provide an aerobic filter bed built up of a plurality of small fabricated units of a suitable non-absorbent material as, for example, hard burned clay, which units may be arranged in any suitable manner within the walled structure of the filter to provide maximum oxidation of the organic matter in the sewage water.

A further object is to provide a filtering medium for aerobic sewage disposal filters comprising a plurality of small non-absorbent clay units having means embodied in the construction thereof for facilitating aeration of the filter bed, and whereby ambient air may readily enter the bed to thereby maintain it in an aerobic condition whereby the chemical action in the filter bed is enhanced.

Other objects of the invention reside in the specific construction of the filter units, whereby they may be conveniently arranged in a suitable filter tank to increase the efficiency thereof and, in the simple and inexpensive construction of said units, whereby they may readily be manufactured in large quantities at very small cost.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

Figure 1:
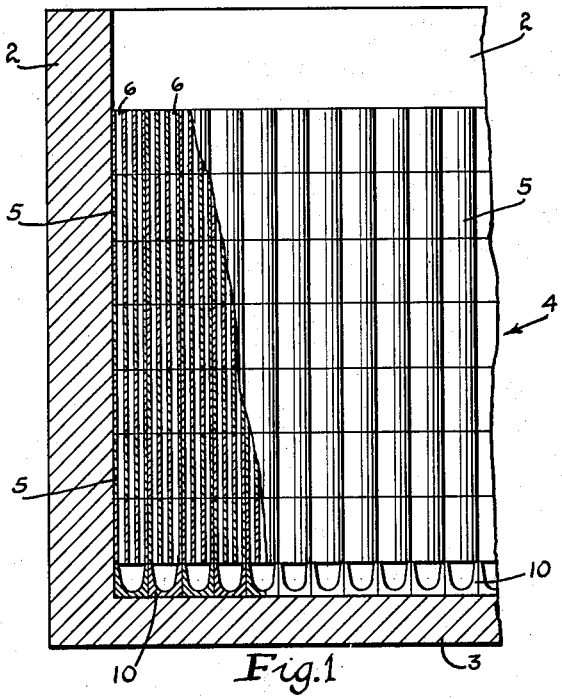
Figure 1 is a view showing a portion of a filter having a filter bed constructed in accordance with the invention and when the filter units are symmetrically arranged with their holes in vertical alignment.
Figure 4:
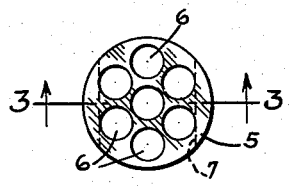
Figure 4 is a plan view of Figure 3.
Figure 2:
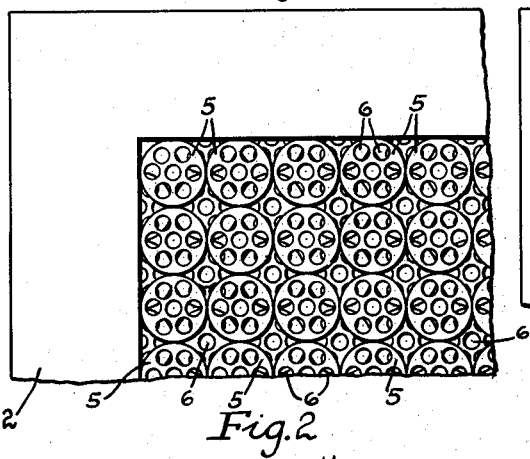
Figure 2 is a plan view of a modified form of construction in which the filter units are arranged in staggered relation.

In the selected embodiment of the invention here shown, for purposes of disclosure, there is illustrated in Figures 1 and 2, a portion of a filter comprising the usual upright walls 2 and bottom wall 3. The filter may be of any suitable size and shaped to meet installation requirements.

An important feature of the invention resides in the construction of the filter bed, generally indicated by the numeral 4. This filter bed is built up of a plurality of small units 5, here shown as cylindrical in cross-section, and each comprising a plurality of holes 6, preferably extended lengthwise through the units, as clearly illustrated in the drawing.

In Figure 1, the filter units 5 are shown supported directly upon a plurality of channel-shaped members 10, suitably supported in the lower portion of the filter as, for example, upon the bottom wall 3. These trough-like members 10 may extend from wall to wall of the filter, and are arranged in abutting relation, as shown, to thereby provide, in effect, a corrugated floor upon which the filter units 5 are supported. The trough-like members receive the treated sewage from the filter bed and conduct it to a suitable receiving means, such as a settling tank, not shown in the drawing.

In Figure 1, the filter units are shown symmetrically arranged in the filter, and with their respective holes in vertical alignment, but it is to be understood that they may be unsymmetrically arranged therein, or disposed in staggered relation, as shown, for example, in Figure 2. By thus arranging the filter units 5 in the filter bed, the number of voids therein, and also the effective surface area of the filter bed are greatly increased, as compared to the usual crushed rock material, whereby the filter bed may be efficiently operated at a much higher capacity than is possible with a crushed rock filter bed, whereby the cost of operation and maintenance is minimized.

Figure 3:
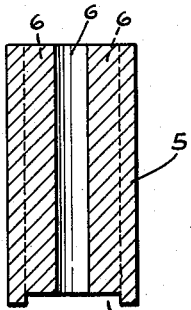
Figure 3 is a cross-sectional view on the line 3—3 of Figure 4, showing one of the filter units removed from the filter bed.

To increase the flow of air through the filter bed, the filter units 5 may be cut away at one end, as indicated at 7 in Figure 3, whereby when the units are arranged as shown in Figure 1, transverse air ducts are provided in the filter bed, whereby said bed is readily maintained in an aerobic condition, which is necessary for rapid propagation of bacteriological organisms.

Figure 5:
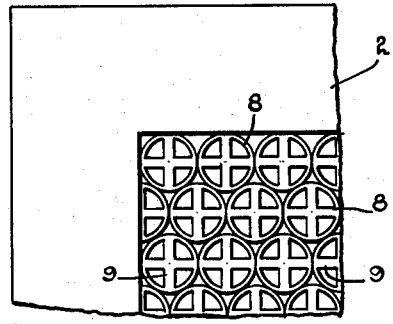
Figure 5 is a view showing a filter unit of modified construction.

In Figure 5, there is shown a filter unit 8 of modified construction comprising a cylindrical body having suitable cross arms or partitions 9 provided therein, which may, if desired, be integrally formed with the cylindrical walls of the unit. I have found that by constructing the filter units 5 and 8 of hard burned clay, they are rendered susbtantially non-porous and are highly resistant to sewage acids, whereby they may be used for an indefinite period without replacement.

Figure 6:
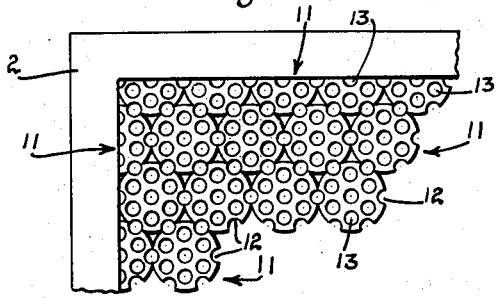
Figure 6 is a view showing another modification wherein the peripheries of the units are fluted or grooved.
Figure 7:
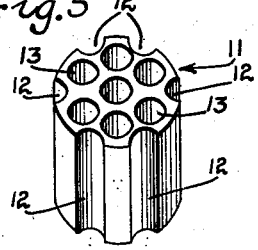
Figure 7 is a perspective view of one of the units shown in Figure 6.

In Figures 6 and 7, there is shown a filter unit 11 having its periphery provided with longitudinally extending flutes or grooves 12, and, like the unit 5, is also provided with longitudinally extending holes 13.

When the units shown in Figure 7 are stacked in a filter, as shown in Figure 6, they provide a honeycomb structure composed of substantially sixty percent of voids and forty percent of solids, whereby the effective surface area of the bed is considerably increased over present day construction. It will also be noted, by reference to Figure 6, that the vertical opening or interstices in the filter bed are substantially uniformly spaced throughout the entire area of the filter bed, whereby all parts thereof are equally effective upon the sewage water to purify the latter. It is also to be noted that there can be no "dead spots" in the bed, when the brick units are arranged as shown in Figure 6, as the entire bed is then uniformly apertured or honeycombed, whereby the sewage may trickle through all portions of the bed without interruption.

Filter beds constructed of crushed rock, often have congested sections as a result of small rock particles filling the interstices between the larger rock particles in sections of the bed. Such "dead spots" or congested sections are less effective upon the sewage, and therefore lessen the efficiency of the filter.

In the drawing, I have shown the filter units cylindrical in cross-section, but it is to be understood that, if desired, they may be made square in cross section, or any other desired shape, which may be found more applicable and desirable for the purpose. The overall length of the units may also be varied and the particular arrangement of the units in the filter bed may also be varied without departing from the scope of the invention. In some instances, it may be found that by making the filter units relatively shorter in length, they may be dumped into the filter tank at random and thereby provide a very efficient filter bed.

The outstanding feature of the invention, as hereinbefore stated, resides in the provision of an improved aerobic filter bed, and in the specific construction of the filter units, per se, which constitute the filter bed. These units, as has previously been stated, are constructed of a suitable non-absorbent material such as hard burned clay, and each has a plurality of holes or apertures therein, whereby the effective surface area of said units is greatly increased. The peripheries of the units may also be grooved or fluted, as shown in Figures 6 and 7, to further increase the percentage of voids in the bed, and the effective surface area thereof. Thus, a filter bed constructed in accordance with this invention, will have a relatively greater number of voids, and much more effective surface area, than a filter bed built up of ordinary crushed rock material, thereby providing a highly efficient aerobic filter for treating sewage and other foul or impure waters.

I claim as my invention:

1. A trickling filter open to atmosphere for purifying sewage water by aerobic bacterial action, comprising a bed composed of a plurality of superposed and laterally adjacent prefabricated units arranged in predetermined relationship, each unit having a plurality of holes extending therethrough and all of said units being arranged with their holes disposed in substantially the same direction, the superposed units being arranged with the walls of their holes in substantially vertical alignment.

2. A trickling filter open to atmosphere for purifying sewage water by aerobic bacterial action, formed with a plurality of substantially vertical conduits having walls constituting bacterial contact surfaces over which the sewage is adapted to flow, said conduits being substantially unobstructed and free of ledges and the like and extending from substantially the top to substantially the bottom of the filter.

3. A trickling filter open to atmosphere for purifying sewage water by aerobic bacterial action, having a plurality of substantially vertical conduits extending therethrough from the top to the bottom thereof, said conduits having smooth continuous walls substantially free of ledges and the like and being substantially uniform in cross-section throughout their entire length, said filter bed being formed of a plurality of superposed and laterally adjacent prefabricated filter units each having a plurality of holes extending therethrough, the walls of the holes being in substantially vertical alignment and the said conduits of the filter bed being formed by the holes of said filter units.

ARTHUR A. PAGE.